Figure 1:
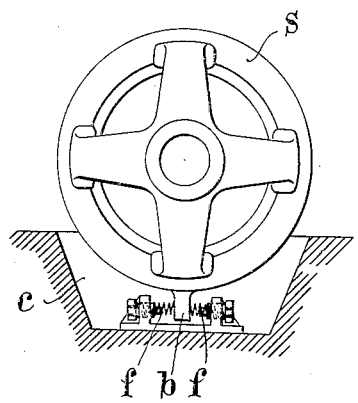

UNITED STATES PATENT OFFICE.

ALBERT AICHELE, OF BADEN, SWITZERLAND, ASSIGNOR TO AKTIENGESELLSCHAFT BROWN BOVERI & CIE., OF BADEN, SWITZERLAND.

PREVENTION OF DISTURBING VIBRATION.

1,161,575.  Specification of Letters Patent.  Patented Nov. 23, 1915.

Application filed February 15, 1913. Serial No. 748,647.

*To all whom it may concern:*

Be it known that I, ALBERT AICHELE, a citizen of the Swiss Republic, and residing at Baden, Switzerland, have invented certain new and useful Improvements in and relating to the Prevention of Disturbing Vibration, of which the following is a specification.

This invention relates to the prevention of disturbing vibrations particularly in machines which have a pulsating torque and more especially in connection with vibrations which occur due to the fact that the impulse given by the torque has a periodicity substantially equal to or a multiple of the natural periodicity of the system which can vibrate, such system including not only the machine parts subjected to the action of the impulse but also the surroundings (for example the foundation) so far as they are so connected with the machine that a mechanical transmission of the pulsating forces takes place. These continual vibrations may loosen the structure of the machine itself and thus cause damage, or even the working of adjacent machines and apparatus (particularly the working of direct current machines) may be interfered with or rendered impossible altogether in consequence of the vibrations transmitted to them.

Heretofore many proposals have been made to avoid or reduce these disturbing vibration phenomena by various methods, either by firmly anchoring the whole machine to a heavy foundation having a high natural periodicity or in direct contra-distinction thereto, by placing the whole machine on an elastic base thereby imparting to the whole system a relatively low periodicity. In both cases the fundamental idea was to make the natural periodicity of the vibratory system either considerably less or considerably more than the periodicity of the pulsation. In many cases, however, it has been found that the result obtained was imperfect and unsatisfactory, as it is frequently impossible to employ a suitable foundation having a high periodicity of its own (for instance when erecting marine engines or engines in the upper stories of buildings, etc.) or the elastic mounting of the whole machine did not yield a sufficient difference between the periodicity of the torque pulsations and the periodicity of the foundation.

The object of the present invention is to provide means for preventing disturbing vibration as indicated above.

This invention consists in restricting the vibration to that part of the machine which is subjected to the direct influence of the impulse and thus keeping the vibration away from the remaining part of the machine itself and from the surroundings.

This invention also consists in so loading the part which otherwise is free to vibrate to some extent for completely or as far as possible preventing vibration.

Figure 2:
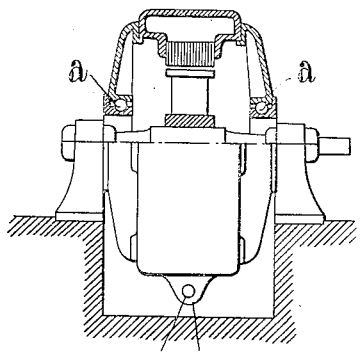
Figure 3:
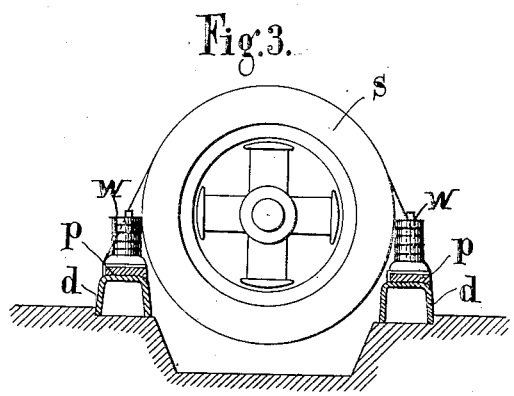

Referring to the accompanying diagrammatic drawings, Figures 1 and 2 show one form of elastic mounting for the stator of an electrical machine according to one construction of the present invention; and Fig. 3 represents a modified arrangement also applied to an electrical machine.

In the form of the invention illustrated in Figs. 1 and 2 the stators are mounted on ball bearings $a$ and capable of rotation to some extent. At its lower part it carries a projection $b$ and is connected to the base or foundation $c$ through the intermediary of springs $f$ which may be adjustable.

In Fig. 3 a special foundation $d$ is provided and between the stator $s$ and this foundation there are placed elastic intermediate layers $p$.

In operation as regards vibration the pulsating torque generally acts on those places of the stationary part of the machine which are next to the rotating part or which surround the same. More strictly speaking therefore, it is the stator from which the vibrations emanate and are transmitted to the casing, shaft and bearings, as well as to the foundation and surroundings. If now as described above the vibration is to be restricted as much as possible to the stator, it is necessary to dispense with a rigid connection between the stator and the other stationary machine parts and the surroundings, and to replace the same by a resilient or elastic connection which permits of a relative movement of the stator in relation to the other stationary parts. By this means a transmission of the vibrations to the immediate and more distant surroundings is practically completely prevented.

In the forms shown in Figs. 1 and 2 if the stator begins to vibrate then it oscillates about a mid position and its movements can only be transmitted to the surroundings after having been damped by the springs $f$.

A similar action occurs in the arrangement shown in Fig. 3 in which the elastic layers $p$ of any suitable material such as india-rubber damp the transmissions of the vibrations of the stator. The localization of the vibration to one machine part according to the present invention does not of course prevent the simultaneous provision of suitable arrangements for entirely suppressing the vibrations, so that therefore in the first place the disturbing effect of the vibrations, and in the second place the vibrations themselves can be suppressed.

The vibration of the stator itself may be decreased or completely prevented by selecting the elasticity and strength of the connection in such a manner that the time or duration of a natural vibration of the stator is considerably greater than the duration of an impulse. This effect of the elastic connection may be further assisted by artificially increasing the mass of the vibrating system (for example by masses $w$ as shown in Fig. 3) by which means the duration of a natural vibration is increased.

In the form illustrated in Figs. 1 and 2 by adjusting the springs $f$ the natural periodicity of the stator system can be made suitably different from that of the disturbing pulsation so that disturbing vibrations cannot be transmitted to the surroundings.

As shown in Fig. 3 it may be desirable to furnish the stator with a separate foundation and to provide the elastic insertion between this separate foundation frame and the foundation. By this means the weight of the vibrating system is increased by the weight of this foundation frame and the foundation frame of the stator may be so constructed that it is suitable for receiving additional weights for the purpose of adjusting the natural periodicity of its system.

It will be understood that the invention is not limited to electrical machines.

Having now described my invention what I claim as new and desire to secure by Letters Patent is:—

1. In combination in machines with pulsating torque a rotor, a stator and a foundation together with an elastic connection between the stator and the foundation in which the connection confines the vibrations to the stator and a rigid connection between the rotor and the foundation; as set forth.

2. In combination in machines with pulsating torque a rotor, a stator, a projection thereon, a foundation, an elastic connection between said projection and said foundation and a rigid connection between the rotor and the foundation; as set forth.

3. In combination in machines with pulsating torque a rotary part, a stationary part concentric with said rotary part, means preventing the stationary part moving along the axis of rotation of the rotary part and means permitting the stationary part to move about the axis of rotation of the rotary part, a fixed abutment and means between said abutment and the stationary part restraining this motion.

In testimony whereof, I affix my signature in presence of two witnesses.

ALBERT AICHELE.

Witnesses:
   CARL GUBLER,
   AUGUST RÜEGG.